(12) United States Patent
Hall

(10) Patent No.: US 8,451,691 B2
(45) Date of Patent: May 28, 2013

(54) METHOD AND APPARATUS FOR DETECTING A LAUNCH POSITION OF A PROJECTILE

(75) Inventor: Liam Hall, Basildon (GB)

(73) Assignee: Selex Galileo Limited, Basildon, Essex (GB)

( * ) Notice: Subject to any disclaimer, the term of this patent is extended or adjusted under 35 U.S.C. 154(b) by 267 days.

(21) Appl. No.: 12/742,596

(22) PCT Filed: Nov. 11, 2008

(86) PCT No.: PCT/EP2008/065332
§ 371 (c)(1),
(2), (4) Date: May 12, 2010

(87) PCT Pub. No.: WO2009/062936
PCT Pub. Date: May 22, 2009

(65) Prior Publication Data
US 2011/0110195 A1    May 12, 2011

(30) Foreign Application Priority Data
Nov. 12, 2007  (GB) .................................. 0722169.0

(51) Int. Cl.
*G01S 3/80* (2006.01)
*G01S 3/801* (2006.01)
*G01S 11/14* (2006.01)

(52) U.S. Cl.
CPC . *G01S 3/801* (2013.01); *G01S 11/14* (2013.01)
USPC ....................................................... 367/118

(58) Field of Classification Search
USPC ......................................................... 367/118
See application file for complete search history.

(56) References Cited

U.S. PATENT DOCUMENTS

| 4,409,899 A | 10/1983 | Owen et al. |
| 5,930,202 A | 7/1999 | Duckworth et al. |
| 2004/0036602 A1 | 2/2004 | Lerg |
| 2005/0001755 A1 | 1/2005 | Steadman et al. |
| 2005/0253017 A1* | 11/2005 | Kongelbeck et al. .......... 244/3.1 |
| 2006/0044941 A1* | 3/2006 | Barger ........................ 367/124 |
| 2006/0044942 A1* | 3/2006 | Brinn et al. ................... 367/124 |

(Continued)

FOREIGN PATENT DOCUMENTS

| EP | 0 219 339 A2 | 4/1987 |
| WO | WO 2006/096208 A2 | 9/2006 |

OTHER PUBLICATIONS

R. B. Stoughton, "SAIC SENTINEL acoustic counter-sniper system" Proceedings of Spie, vol. 2938, Nov. 19, 1996, pp. 276-284, XP-002517180.

(Continued)

*Primary Examiner* — Isam Alsomiri
*Assistant Examiner* — James Hulka
(74) *Attorney, Agent, or Firm* — Buchanan Ingersoll & Rooney PC

(57) ABSTRACT

A method and apparatus for detecting the launch position of a projectile is described. The apparatus includes at least one wideband microphone array positioned so as to be responsive to acoustic emissions generated by the launch and flight of a projectile. The apparatus includes signal processing means, for processing the signals generated by the microphone array or arrays, the output of which provides an estimate of launch position and kinematic information relating to the projectile.

15 Claims, 4 Drawing Sheets

LP = Launch Point
IGP = Motor Ignition Point
CPA = RPG Closest Point of Approach
IP-RPG impact/explosion Point Compact Mic

U.S. PATENT DOCUMENTS

| | | | |
|---|---|---|---|
| 2006/0044943 A1* | 3/2006 | Barger et al. | 367/127 |
| 2006/0227980 A1* | 10/2006 | Barger | 381/92 |
| 2007/0030763 A1* | 2/2007 | Barger et al. | 367/127 |
| 2007/0171769 A1* | 7/2007 | Brinn et al. | 367/13 |
| 2007/0237030 A1* | 10/2007 | Barger et al. | 367/127 |
| 2008/0159078 A1* | 7/2008 | Barger et al. | 367/127 |

OTHER PUBLICATIONS

Notification of Transmittal of the International Search Report (Forms PCT/ISA/220 and PCT/ISA/210) and the Written Opinion of the International Searching Authority (Form PCT/ISA/237) issued in the corresponding International Application No. PCT/EP2008/065332 dated Mar. 11, 2009.

International Search Report (PCT/ISA/210) for PCT/EP2008/065332 dated Mar. 11, 2009.

United Kingdom Search Report for GB 0722169.0 dated Apr. 25, 2008.

\* cited by examiner

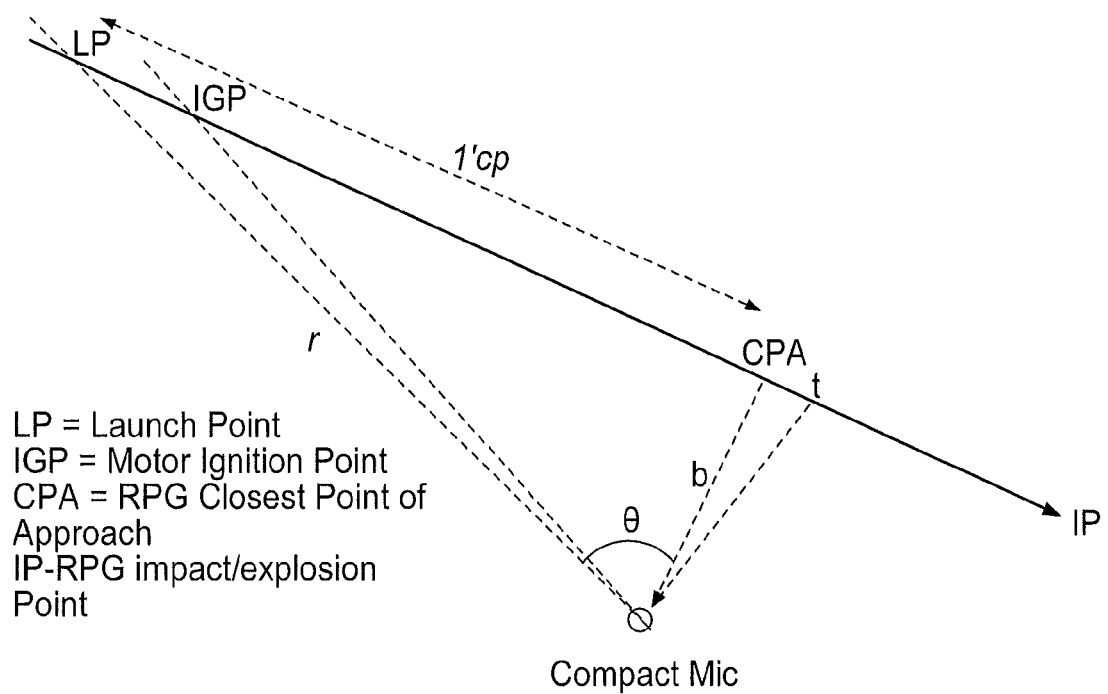
LP = Launch Point
IGP = Motor Ignition Point
CPA = RPG Closest Point of Approach
IP-RPG impact/explosion Point
Fig.1 RTG
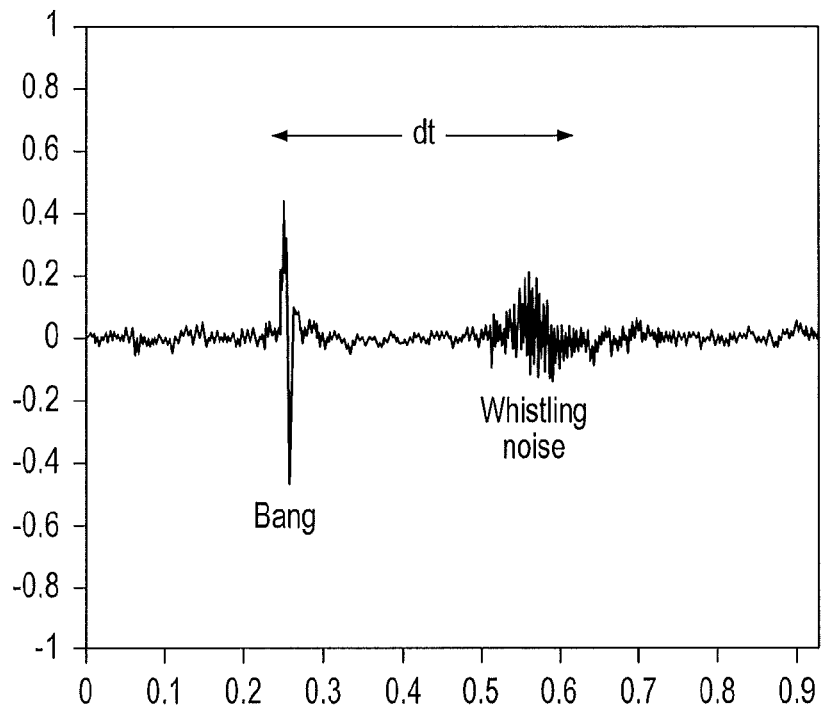
Fig.2(a)

RPG response measured by single wideband Microphone

Time-windowed cross correlation of RPG whistling noise from two wideband microphones

METHOD AND APPARATUS FOR DETECTING A LAUNCH POSITION OF A PROJECTILE

The present invention relates to a method of detecting the launch position of a projectile. More specifically but not exclusively, the invention relates to a novel process for locating a launch point and estimating the kinematics of Rocket Propelled Grenades (RPGs) using a very small compact array of acoustic microphones with a wide measurement bandwidth.

There is currently a requirement to quickly locate and assess threats from RPG attacks on mobile military platforms (e.g. AFV or tank) and/or static locations (e.g. a base) via a cost-effective and relatively small sensor system.

Accordingly, there is provided a system for estimating the launch position of a projectile aimed toward a target, comprising at least one wideband microphone array, the array being responsive to the wideband acoustic response from the projectile, said response being indicative of the launch position and additional kinematic information relating to the projectile.

Additionally, there is further provided a system for estimating the launch position of a projectile aimed toward a target, the system comprising at least one wideband microphone array responsive to acoustic triggers including a projectile launch bang or any motor ignition noise or a whistling noise of the projectile passing the array, said triggers causing acoustic responses in the array indicative of the launch position of the projectile.

Moreover, there is further provided system for estimating trajectory and local velocity of a projectile aimed toward a target comprising a plurality of spaced apart, compact wideband microphone arrays, said arrays being responsive to the acoustic emissions of the projectile passing adjacent the plurality of microphone arrays, the response of the arrays being indicative of the trajectory and local velocity of the projectile.

Additionally, there is further provided a method of locating the launch position of a projectile comprising the step of monitoring the acoustic response of at least one wideband microphone array to acoustic triggers including projectile launch bang or any motor ignition noise or a whistling noise of the projectile passing the array.

In this fashion, the launch position and kinematics of RPGs can be established in a relatively simple and cost effective manner.

The invention will now be described, by example only, with reference to the following invention in which;

FIG. 1 is a schematic diagram showing the geometry of an RPG attack on a moving target;

The RPG launch, as measured by each microphone within the array, will involve a wideband noise event at the launch (referred to herein as the 'bang') that propagates from the launch point to the array at the speed of sound in air. However, another important wideband noise that can be measured by the compact array and that will generally arrive after the launch bang, is the complex acoustic response of the RPG projectile passing the array including its rocket motor burning. This noise is referred to herein as the 'whistling' noise. A further third discrete sound may also be detected in some cases soon after the RPG launch (e.g. 10 m into flight for an RPG-7), that is related to the rocket burner ignition. Finally, the RPG impact and/or explosion noise may also be measured by the compact array. Some combination of measuring all four events across the array microphones can be used to estimate one or more of the following:—trajectory of the RPG projectile, its velocity, the miss distance and/or the launch location.

Figure 2B:
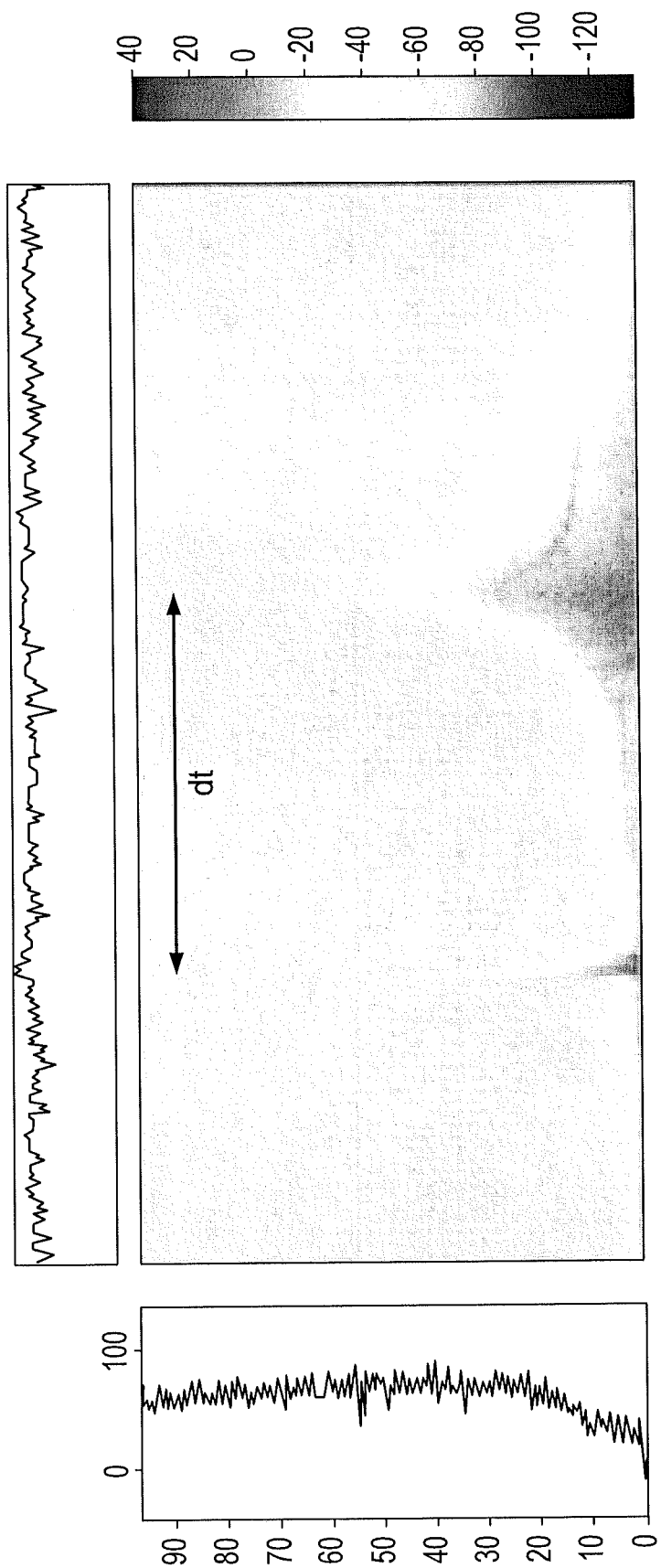
FIG. 2 shows an RPG response measured by single wideband microphone.
Figure 3A:
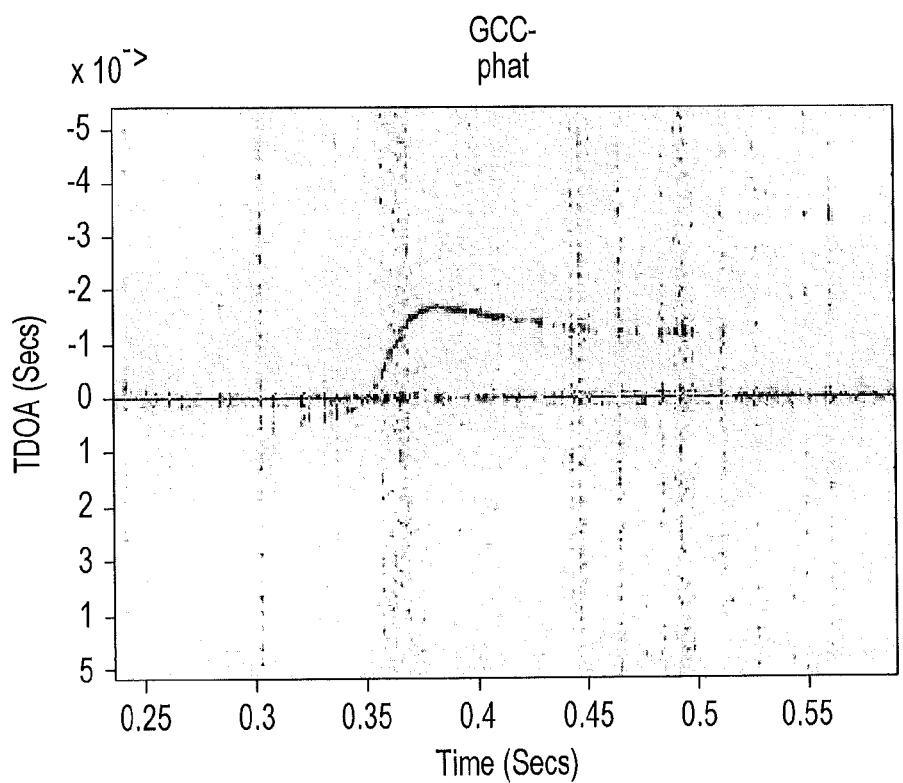
FIG. 3 shows a time-windowed cross correlation of RPG whistling noise from two wideband microphones In a first embodiment of the invention, the detection apparatus comprises a compact array of very wideband microphones (1 to 100 kHz) mounted at a point remote from the launch position of the RPG.
Figure 3B:
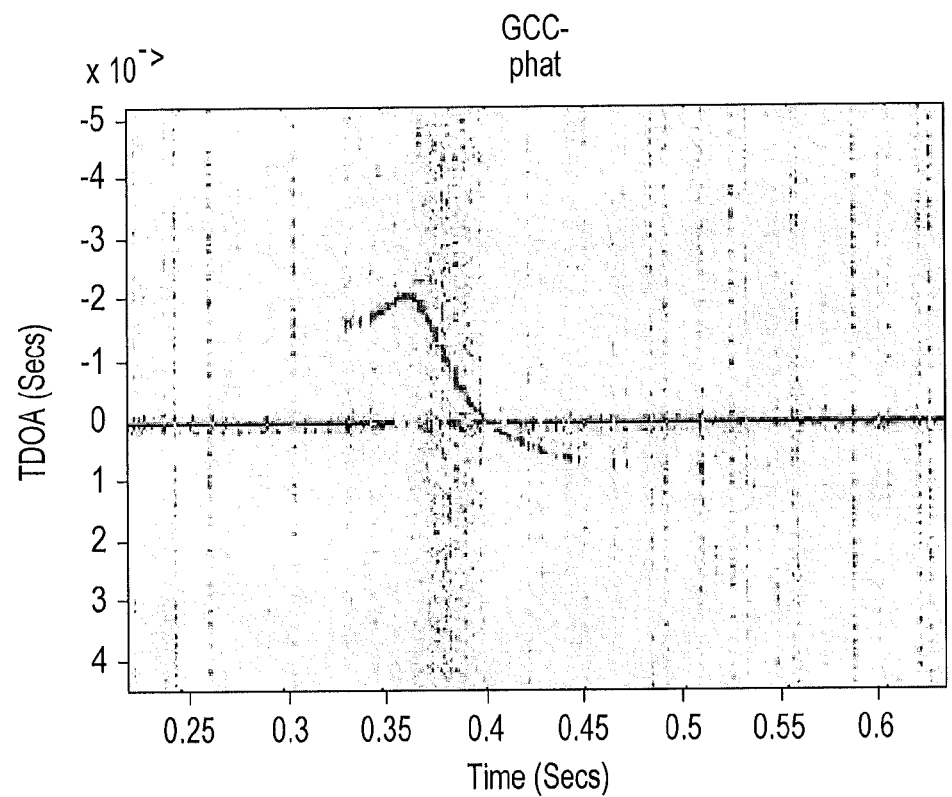
Figure 3C:
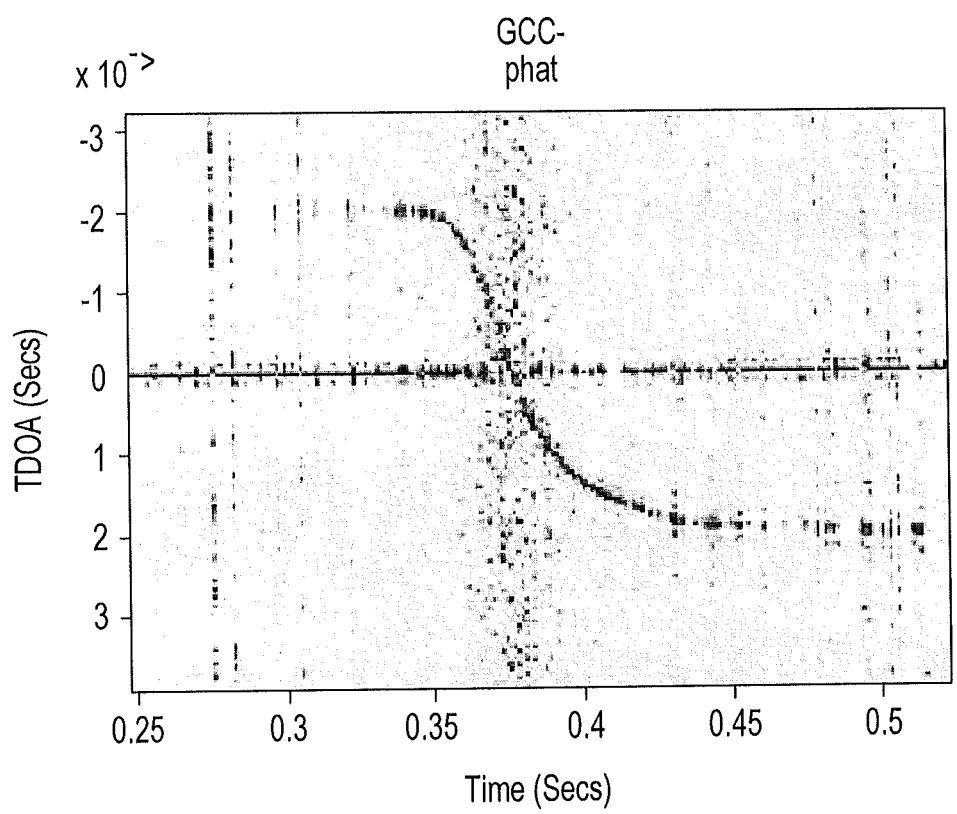

The first embodiment of the invention may involve estimating the direction of arrival (DOA) or the bearing to the launch point LP, the ignition point IGP and/or the impact point IP via conventional time delay estimation (TDE) techniques, as shown in FIG. 1. For example, by applying a time-windowed Generalised Cross-Correlation algorithm to the time-synchronised response from each independent pair of microphones within the array, correlation peaks can indicate the TDOA for the acoustic waveform incident across the array. Such TDOA estimates can then be combined with a matrix describing the relative microphone positions and estimates of the speed of sound to determine a DOA vector for the measured RPG event. One common approach to solving this equation to estimate the DOA vector is the non-linear Levenburg-Marquartz optimization algorithm. However, further to these standard techniques, a windowed cross correlation technique can also be applied to the wideband whistling noise of the passing projectile as measured by each microphone within the compact array, as shown in FIG. 2. This produces a measurable set of peak energy traces that describes the angle of arrival estimation for the passing projectile changing over the time period that the whistling noise is measured (i.e. when the RPG is local to the array), as illustrated in FIG. 3. From each independent microphone pair channel, such trace features within the time windowed cross-correlation plot can directly infer by geometry the projectile miss distance (b) and its local speed/velocity ($V_{rpg}$) and can also be used to estimate the local trajectory of the RPG projectile, assuming the RPG velocity is locally constant.

Estimation of the RPG Launch location or range r using the whistling noise can be achieved in more than one way. The simplest way would involve extrapolating the local estimation of RPG trajectory back until it intersects with the DOA estimation from synchronous launch bang measurements across the array (as outlined above). Alternatively, it is possible to estimate r by first calculating the angle θ between the launch DOA and a vector pointing at the closest point of approach CPA. Depending on the orientation of the array with respect to the launch DOA estimate, θ can be found as the difference or summation of the launch DOA estimate relative to the array orientation and the CPA direction relative to the array. The latter CPA direction can be calculated by first estimating time of maximum whistling energy that relates to the point at which the projectile is closest to the array. This time point can then be used within the cross correlation plots to estimate the DOA of the closest point of approach (i.e. from the TDOA trace features). It is noted that the absolute time at which the RPG is closest to the array leads the time of maximum whistling noise response by a time equal to the ratio of miss distance to velocity of sound in air. From calculating θ, and assuming that the angle between the projectile trajectory and the array at the CPA point is at 90° (i.e. normal), the range r and the range to the CPA point $r_{cp}$ can be calculated by simple trigonometry:—

$$r = \frac{b}{\cos\theta}$$

$$r_{cp} = b \cdot \tan\theta$$

It is further noted that a check to such estimation of r can be accomplished on each microphone channel by estimating dt as indicated in FIG. 2. dt is defined as the absolute difference between the time of arrival (TOA) of the launch bang and the time of arrival of the maximum whistling noise energy, that is associated to the RPG closest point of approach (CPA). This can be used to confirm the important parameters relating RPG kinematics (r and b) and the velocity of sound Vs using the simple equation:—

$$dt = \left(\frac{r_{cp}}{V_{rpg}} + \frac{b}{V_s}\right) - \left(\frac{r}{V_s}\right)$$

where Vrpg is an averaged velocity of the projectile; that may be estimated from a prior knowledge of projectile kinematics. Hence, using a combination of conventional estimation of the Direction of arrival of the launch bang, the ignition point and the explosion/impact point and the novel estimate of the RPG trajectory as it passes (i.e. spatially correlated whistling noise) provides an adequately accurate estimation of RPG kinematics.

Another approach to processing this whistling noise for the RPG would involve parametric or statistical based estimation of the RPG miss distance and/or velocity directly from the time domain responses (as shown in FIG. 2). Statistical or parametric interpretation of the raw whistling noises may also provide RPG classification. Further estimation of the local velocity of the RPG projectile may be obtained by conventional spectral processing (e.g. STFT), as illustrated by the Spectrogram in FIG. 2, and identification of Doppler frequency changes. Also, the use of any conventional narrowband beam forming and/or high or super-resolution DOA estimation methods such as the MUSIC algorithm may be applied to tonal information within the whistling noise. Further, as the measured whistling noise is wideband, incoherent wideband DOA techniques such as IMUSIC or coherent DOA algorithms such as CSSM may also be applied to track the local DOA of the RPG.

Another embodiment of the invention may involve more than one compact wideband array spatially separated upon a military platform or convoy of platforms. For example, four compact arrays may be placed at each corner of the roof of an armoured military land vehicle. In this case, each array can generate independent estimates of the RPG azimuth and elevation vector and a potentially more accurate estimation of local trajectory. Further advantages of such an array configuration include less susceptibility to turbulent wind effects, less susceptibility to acoustic shading from the platform (e.g. a turret) and measurement redundancy.

Preferably the spacing between the wideband microphones within the array is of the order of 25 cm. However, it will be appreciated that any suitable spacing may be used.

The system described above may be used to distinguish between tracer fire and non-tracer fire.

It will be appreciated that projectiles other than RPGs may be monitored and detected subject to acoustic triggers being detectable and measurable by wideband microphone arrays.

It will further be appreciated that the acoustic triggers described in detail above are not limiting and other acoustic triggers may be measurable and detectable using the above technique.

It is finally noted that for each embodiment, the effects of a moving platform and hence moving compact microphone array can also be accounted for within the process of interpreting the TDOA cross correlation plots depicting the whistling noise features. Therefore, it may be possible to mount the array, or multiple arrays, on the potential target vehicle.

The invention claimed is:

1. A system for estimating the launch position of a projectile aimed toward a target, comprising:
    at least one wideband microphone array, the array being responsive to the wideband acoustic response from the projectile said acoustic response including a whistling noise generated by rocket motor burn of the projectile, and a response of the array being indicative of the launch position and additional kinematic information relating to the projectile; and
    signal processing means for processing signals output from the at least one wideband microphone array, said signal processing means using a cross-correlation algorithm that exploits a spatial correlation exhibited by at least one of the whistling noise and a motor ignition noise of the projectile in flight.

2. The system according to claim 1 in which the kinematic information includes the projectile velocity, the projectile miss distance, the absolute time of local approach and the projectile local trajectory.

3. The system according to claim 1 in which the signal processing means includes Doppler processing on the whistling sound of the projectile in flight to estimate local approach or retardation speed of the projectile relative to a target.

4. The system according to claim 3, in which the signal processing means includes use of one stage wideband DOA or localisation algorithms.

5. The system according to claim 3, in which the signal processing means includes angle-only tracking algorithms to estimate the local trajectory of an RPG from its whistling noise.

6. The system according to claim 1, in which the signal processing means includes one stage wideband DOA or localisation algorithms.

7. The system according to claim 1, in which the signal processing means includes angle-only tracking algorithms to estimate the local trajectory of an RPG from its whistling noise.

8. The system according to claim 7, in which the angle-only tracking algorithms include Kalman filtering techniques.

9. The system according to claim 1, in which the wideband microphone array comprises a plurality of very wideband microphones having a response of 1 to 100 kHz.

10. The system according to claim 1, in which the projectile is a rocket propelled grenade.

11. A system for estimating the launch position of a projectile aimed toward a target, the system comprising:
    at least one wideband microphone array responsive to acoustic triggers including a projectile launch bang or any motor ignition noise or a whistling noise of the projectile passing the array, said triggers causing acoustic responses in the array indicative of the launch position of the projectile; and
    signal processing means for processing signals output from the at least one wideband microphone array, said signal processing means using a cross-correlation algorithm that exploits a spatial correlation exhibited by at least one of the projectile launch bang, the motor ignition noise, and the whistling noise of the projectile in flight.

12. A system for estimating trajectory and local velocity of a projectile aimed toward a target comprising:
a plurality of spaced apart, compact wideband microphone arrays, said arrays being responsive to the acoustic response of the projectile passing adjacent the plurality of microphone arrays, the acoustic response of the projectile including at least a whistling noise generated by rocket motor burn and a response of the arrays being indicative of the trajectory and local velocity of the projectile; and
signal processing means for processing signals output from the at least one wideband microphone array, said signal processing means using a cross-correlation algorithm that exploits a spatial correlation exhibited by at least one of the whistling noise and a motor ignition noise of the projectile in flight.

13. A method of locating the launch position of a projectile comprising:
monitoring the acoustic response of at least one wideband microphone array to acoustic triggers including projectile launch bang or any motor ignition noise or a whistling noise of the projectile passing the array; and
processing signals output from the at least one wideband microphone array, said signal processing means using a cross-correlation algorithm that exploits a spatial correlation exhibited by at least one of the projectile launch bang, the motor ignition noise, and the whistling noise of the projectile in flight.

14. The method according to claim 13, in which the wideband microphone array comprises a plurality of very wideband microphones having a response of 1 to 100 kHz.

15. The method according to claim 13, in which the projectile is a rocket propelled grenade.

* * * * *